United States Patent [19]

Cook

[11] Patent Number: 4,821,395
[45] Date of Patent: Apr. 18, 1989

[54] METHOD AND APPARATUS FOR ADJUSTING THE BACKLASH ON A DIFFERENTIAL

[75] Inventor: Michael S. Cook, Waterloo, Iowa
[73] Assignee: Deere & Company, Moline, Ill.
[21] Appl. No.: 172,153
[22] Filed: Mar. 23, 1988
[51] Int. Cl.⁴ .............................................. F16H 55/20
[52] U.S. Cl. ......................................... 29/407; 74/409
[58] Field of Search ...................... 29/407; 74/409, 713

[56] References Cited

U.S. PATENT DOCUMENTS

| | | | |
|---|---|---|---|
| 2,680,972 | 6/1954 | Tone | 74/409 X |
| 2,924,125 | 2/1960 | Brandon | 74/713 |
| 3,137,181 | 6/1964 | Guilbert | 74/409 X |
| 3,512,430 | 5/1970 | Sutherland | 74/409 X |
| 3,708,857 | 1/1973 | Pfeiffer | 29/407 |
| 3,875,646 | 4/1975 | Pfeiffer | 29/407 |
| 4,580,640 | 4/1986 | Chang et al. | 74/409 |
| 4,742,725 | 5/1988 | Nagai | 74/409 |

*Primary Examiner*—Mark Rosenbaum
*Assistant Examiner*—Frances Chin

[57] ABSTRACT

A method for adjusting the backlash between the pinion gears and the bevel gears of a bevel-type differential is to mount the elements in the corresponding differential housing half, hold the pinion gears against the half and press the bevel gear towards the bevel pinion gears. The travel distance of the bevel gear is measured, and a shim is provided between the bevel gear and the housing having a thickness approximately equal to the difference between the measured displacement and the previously calculated desired displacement. An apparatus for practicing the method has a clamp for holding the pinion gears to the housing, locating means for precisely positioning the housing and bevel gear relative to one another, an air cylinder to press the bevel gears towards the pinion gear, and a micrometer used to measure the travel distance of the bevel gear. The clamp preferably also includes tangs resiliently pressing the bevel gear away from the pinion gears, both to aid in separating the bevel gear from the pinion gears and to compress any clutch pack in the differential, e.g., if it is a limited slip differential.

3 Claims, 1 Drawing Sheet

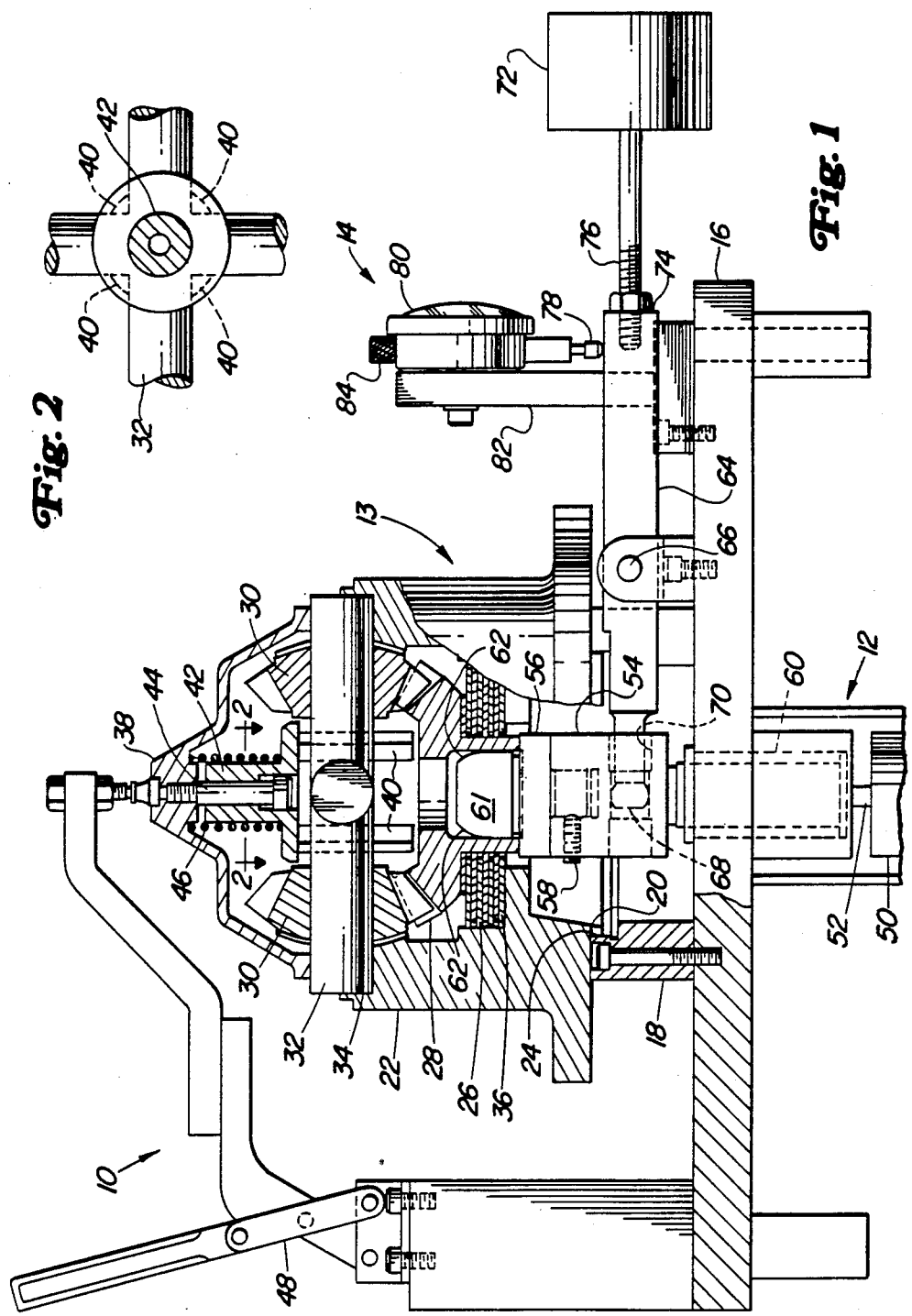

METHOD AND APPARATUS FOR ADJUSTING THE BACKLASH ON A DIFFERENTIAL

BACKGROUND OF THE INVENTION

1. Field of the Invention

The present invention relates to techniques for adjusting the backlash between the bevel gears and the pinion gears in a bevel-type differential.

2. Description of the Related Art

A typical bevel-type differential has two bevel gears and a plurality of pinion gears, typically four, mounted in a differential housing. If it is a limited slip differential, various clutch and separator plates also are provided between each bevel gear and the housing to clutch the two together. For proper operation, a small amount of play or backlash normally is provided between each bevel gear and the pinion gears. The amount of play typically is adjusted by changing the thickness of a shim between the bevel gear and the housing, or, in the case of the limited slip differential, between the clutch pack and either the housing or the bevel gear.

Due to manufacturing tolerances, the backlash between each bevel gear and the pinion gears normally must be adjusted for each differential by adjusting the thickness of the shim used. In the past, this has been accomplished by placing one of the bevel gears and the clutch pack (if any) in the corresponding half of the differential housing. The pinion gears on the shaft then are placed on top of the housing in the position they will occupy upon final assembly. The pinion gears are then moved back and forth by hand, and a micrometer is used to measure the backlash directly, i.e., to measure how far each pinion gear moves before it engages the bevel gear. The average measured backlash of all the pinion gears is then used to estimate the shim pack thickness required to bring the backlash within design specifications. A shim pack of this size then is added and the process repeated until the appropriate backlash is obtained. The entire process then is repeated with the other bevel gear in the other half of the differential housing. The adjustment and assembly process for the complete differential can take as much as three hours.

SUMMARY OF THE INVENTION

Accordingly, it is an object of the present invention to provide a technique and apparatus for significantly reducing the amount of time required to adjust and assemble a differential.

According to the present invention, instead of moving the pinion gears back and forth to determine the backlash, the pinion gears are held against the differential housing and the bevel gear is moved upwards towards the pinion gears. It is a relatively simple matter to calculate ahead of time how far the bevel gear should move towards the pinion gears when the spacing therebetween is at the appropriate backlash. This correct distance is subtracted from the measured actual travel distance from the bevel gear to provide the appropriate shim thickness. Such a shim then is added to the differential, the displacement is verified, and adjustment for that bevel gear is complete. The process is repeated for the other bevel gear, and the differential then is assembled. Using the apparatus discussed below, the entire process can be accomplished in just ten minutes.

The apparatus according to the present invention for carrying out the method just described has a locating ring on which a differential housing half can be positioned in a predetermined location. The bevel gear, clutch pack (if any) and pinion gears are placed in the differential housing, and the mechanism clamps the pinion gear shafts down to the housing. The mechanism also preferably presses the bevel gear and clutch pack together to eliminate any play therebetween, which would result in a false reading. An air cylinder is provided to press the bevel gear up against the pinion gears. While manual pressure could be provided, the air cylinder eliminates variances due to varying operator force in a manual situation. A micrometer provided on the apparatus measures the displacement of the air cylinder and the bevel gear. If desired, the micrometer could be labeled to indicate directly the thickness of the appropriate shim, possibly with several different scales depending on the differential being adjusted. After measurement is made, the clamp is released and the differential is partially disassembled to allow addition of the shim pack. It then is reassembled, reclamped and the measurement verified. The entire process is repeated with the other half of the differential housing, and the differential is assembled.

BRIEF DESCRIPTION OF THE DRAWINGS

FIG. 1 is a view in partial section of the apparatus according to the present invention.

FIG. 2 is a plan view along the line 2—2 in FIG. 1.

DETAILED DESCRIPTION OF THE PREFERRED EMBODIMENTS

The figures depict a preferred apparatus according to the present invention for carrying out the method according to the present invention. As shown in FIG. 1, the apparatus has a clamp 10, an air cylinder 12, and a micrometer 14 mounted to a base 16. A locating ring 18 also is mounted to the base 16 coaxially with the air cylinder 12. In use, the bearing extension 20 of the differential housing half 22 fits snuggly inside the inner rim 24 of the locating ring 18, thereby precisely positioning the differential housing half 22 relative to the air cylinder 12.

The apparatus is illustrated with half of a limited slip differential 13 mounted thereon. In addition to the differential housing half 22, the differential includes a plurality of interleaved clutch plates and separators forming a clutch pack 26, a bevel gear 28, and a plurality of pinion gears 30 mounted on corresponding cross pins 32. The cross pins 32 rest in suitable depressions 34 formed in the differential housing 22. A shim 36 also is provided between the clutch pack 26 and the differential housing half 22.

The clamp 10 serves to clamp the cross pins 32 into the depression 34 and to fully compress the clutch pack 26 and bevel gear 28. In particular, the clamp 10 has a clamp cup 38 at one end thereof, the outer rim of which presses down against the cross pins 32 when the clamp is closed, thereby forcing the cross pins 32 firmly into the depressions 34. The cup is shaped to avoid interfering ith movement of the pinion gears 30, which therefore remain free to rotate around their respective cross pins 32. The clamp also is provided with a plurality of fingers or tangs 40 extending down from the center thereof to press against the upper surface of the bevel gear 28, thereby compressing the clutch pack 26 and bevel gear 28. These tangs 40 extend from a central cylinder 42 which is slidably mounted on the cup 38 by a shoulder screw 44. A spring 46 extending between the cup 38 and the tangs 40 biases the tangs 40 towards the bevel gear 28. As shown in FIG. 2, the tangs 40 are sized and positioned to extend between the cross shafts 32 without interfering with them or with the bevel gears 30. Returning to FIG. 1, clamping force is provided for the clamp 10 by a simple over-center mechanism 48. Obviously, any other suitable mechanism could be employed.

The air cylinder 12 has a pneumatic cylinder 50 which is provided with pressurized air to raise the bevel gear, as discussed below. The pneumatic cylinder 50 has a rod 52 extending therefrom towards the bevel gear 28. The upper end of the rod connects to a cylinder 54 which has a force applicator 56 mounted thereon. The force applicator 56 preferably is firmly attached to the cylinder 54, e.g., by a set screw 58. The rod 52 is guided in a bushing 60 mounted in the base 16 of the apparatus, thereby ensuring accurate alignment of the entire air cylinder apparatus. The force applicator 56 has a spud 61 extending upwardly therefrom which fits snuggly within the bevel gear 28. The upper side surfaces 62 of the spud 61 preferably are curved or tapered to allow easy insertion of the spud 61 within the bevel gear 28. Since the fit between the spud 61 and the bevel gear 28 is snug, the bevel gear 28 is properly positioned relative to the other elements of the differential once it is mounted on the spud 61. However, this snug fit also means that the spud 61 may stick in the bevel gear 28, so some suitable method such as the set screw 58 for fixing it to the cylinder 54 is recommended. The lower surface of the bevel gear 28 rests against the upper surface of the force applicator 56, so the cylinder 56 can press the bevel gear 28 upwards towards the pinion gears 30.

The micrometer 14 has a bar 64 which is pivotally mounted to the base 16 by a pivot 66. One end 68 of the bar 64 extends into an opening 70 in the cylinder 54 of the air cylinder 12, so that it will be moved up and down with the cylinder 54. The bar end 68 preferably is formed in the shape of a ball to minimize friction between its outer surface and the inner surface of the bore 70. A weight extension 72 preferably is mounted to the other end 74 of the bar 64. The exact position of the weight 72 relative to the bar 64 preferably is adjustable, e.g., by threads 76, to allow for precise balancing of the bar 64. A measuring piston 78 with an attached dial indicator 80 is mounted to the base 16 by a stand 82, so that the piston 78 and dial indicator 80 are precisely positioned relative to the base. The dial indicator 80 preferably is adjustable, e.g., by an adjustment knob 84, so that it can easily be recalibrated to zero after every use. As shown, the piston 78 presses against the upper surface of the bar 64, and the dial indicator 80 indicates the amount of displacement of the bar 64 at that point. Preferably, the piston 78 presses against the bar 64 at precisely the same distance from the pivot point that the center line of the air cylinder 12 and the ball end 70 of the bar 64 are from the pivot point 66. In this way, the displacement at the distance 78 is precisely the same as the displacement at the bevel gear 28. The dial indicator 80 should be marked appropriately to allow reading of the exact displacement. If desired, the gradations marked on the dial indicator 80 could already be adjusted for the desired backlash, so that they indicate directly the size shim to be used. The dial indicator 80 also could be provided with several such pre-set gradations to allow for the use of the same apparatus with several differentials.

OPERATION

To use the apparatus just described according to the method of the present invention, the differential housing half 22 is first positioned on the locator ring 18. The clutch pack 26 and bevel gear 28 then are positioned within the housing half 22. The pinion gears 30 are mounted to the corresponding cross pins 32, which then are placed in the depressions 34 in the housing half 22. The clamp 10 then is positioned over the thus assembled differential half and closed, with the tangs 40 extending between the cross pins 32 to engage the bevel gear 28 Closing of the clamp holds the cross pins 32 in the depressions 34 and compresses the clutch pack 26 and bevel gear 28.

The air cylinder 12 then is activated to press the bevel gear 28 toward the pinion gears 30, and released to allow the bevel gear 28 to move downwards (aided by the spring 46). This process is repeated several times to assure proper seating of the bevel gear 28 and pinion gears 30. The dial indicator 80 then is zeroed, the air cylinder 12 activated, and a reading of the distance traveled by the bevel gear 28 taken from the dial indicator 80. The pre-calculated correct displacement is subtracted from the reading to provide an appropriate shim pack thickness. For example, if the design specification calls for the displacement to be 1.8 mm, while the measured displacement is 10 mm, a shim pack will be made up of about 8.2 mm in thickness.

The clamp 10 then is released, the parts removed from the differential housing half 22, the shim pack 36 added, and the other parts returned to the differential housing half 22. The clamp 10 then is closed and the measurement process repeated. If the dial indicator 80 then is within the tolerance range prescribed for the backlash, the adjustment for this differential half is complete. For example, with a 1.8 mm preferred displacement, a typical tolerance range might be anywhere between 1.0 mm and 2.3 mm displacement, so that if the dial indicator 80 is within this range, the backlash is considered properly adjusted. If the measurement is not within the tolerance, the difference is determined, and the appropriate thickness added to or substracted from the shim pack 36.

This process then is repeated with the other bevel gear and the other half of the differential. Once the appropriate shim pack thickness is determined for each side of the differential, the differential can quickly be assembled and adjustment is complete.

The apparatus according to the present invention is readily adaptable for use with a number of differently sized differentials. All that is required is substitution of the appropriately sized locator ring 18, force applicator 56 and adjustment of the position of the weight 72 to counteract any differences in mass due to the different force applicator 56. Of course, for sufficiently different differentials, it may be necessary to change the clamp cup 38 and tangs 40 to match the different sizes.

It is to be understood that while the method according to the present invention has been described with reference to a particular apparatus for carrying out the method, the method could be carried out using any other suitable apparatus, or even by hand. Similarly, while the method and apparatus have been described in connection with adjusting the backlash in a limited slip differential, the backlash could be adjusted in a similar fashion for other types of bevel-type differentials.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A method for adjusting the backlash between the bevel gears and pinion gears of a bevel-type differential, comprising:
    assembling the pinion gears and one bevel gear into one half of the differential housing;
    pressing said bevel gear towards said pinion gears while holding said pinion gears firmly in position in said differential housing half;
    measuring the distance travelled by said bevel gear;
    preparing a shim pack having a thickness approximately equal to the difference between the measured bevel gear travel distance and a pre-determined desired bevel gear travel distance; and
    placing said shim pack in said differential half between said bevel gear and said housing.

2. The method of claim 1, further comprising:
    assembling a second bevel gear and said pinion gears in a second half of the differential housing;
    pressing said second bevel gear towards said pinion gears while holding said pinion gears firmly in position in said second differential housing half;
    measuring the distance travelled by said second bevel gear;
    preparing a shim pack having a thickness approximately equal to the difference between the measured bevel gear travel distance and a predetermined desired bevel gear travel distance; and
    placing said shim pack in said differential half between said bevel gear and said housing.

3. The method of claim 2, wherein said differential comprises a limited slip differential, and further comprising the step of compressing each said bevel gear towards the corresponding differential housing half to compress a clutch pack of said limited slip differential prior to pressing said bevel gear towards said pinion gears.

* * * * *